Dec. 26, 1967 JAMES E. WEBB 3,359,855
ADMINISTRATOR OF THE NATIONAL AERONAUTICS
AND SPACE ADMINISTRATION
OPTICAL PROJECTOR SYSTEM
Filed Sept. 9, 1966 5 Sheets-Sheet 1
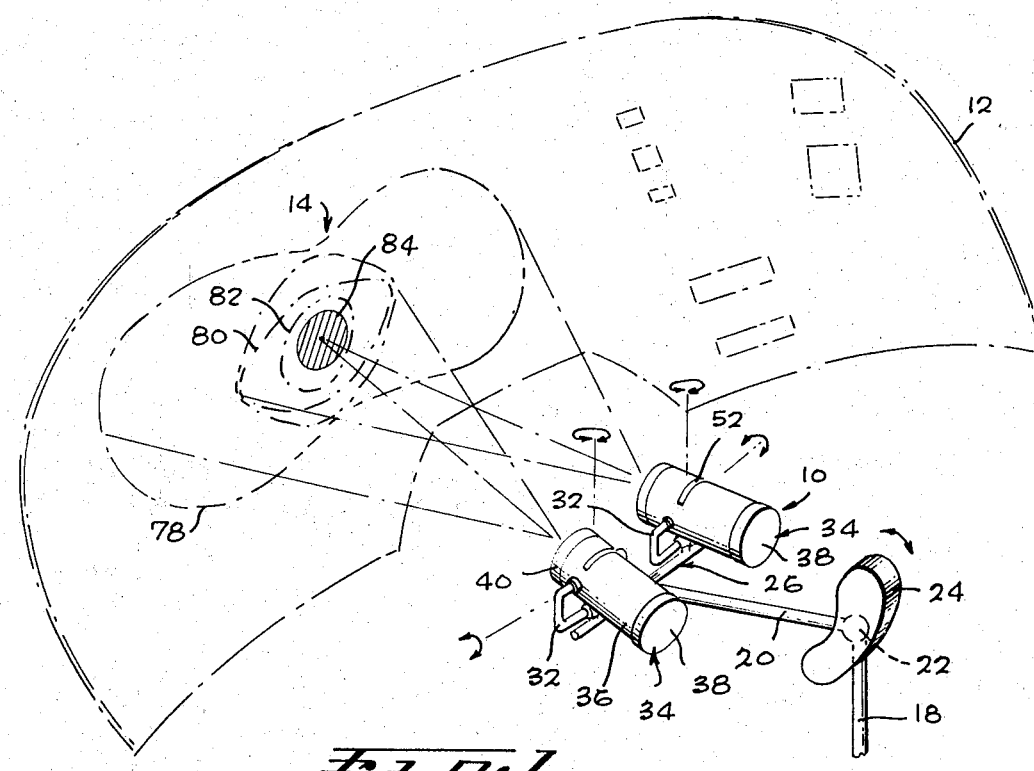
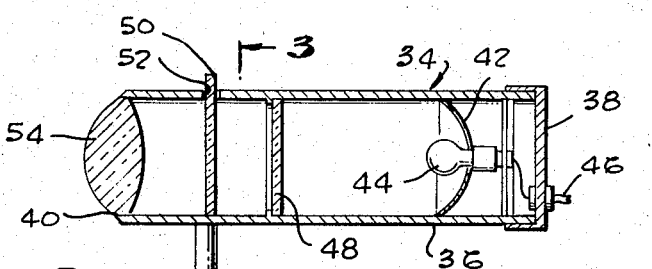
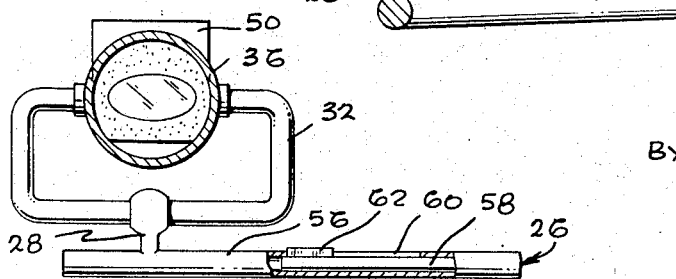
ROBERT A. BEAM
INVENTOR
BY
ATTORNEYS Dec. 26, 1967  JAMES E. WEBB  3,359,855
ADMINISTRATOR OF THE NATIONAL AERONAUTICS
AND SPACE ADMINISTRATION
OPTICAL PROJECTOR SYSTEM Filed Sept. 9, 1966 5 Sheets-Sheet 2

ROBERT A. BEAM
INVENTOR

BY

ATTORNEYS

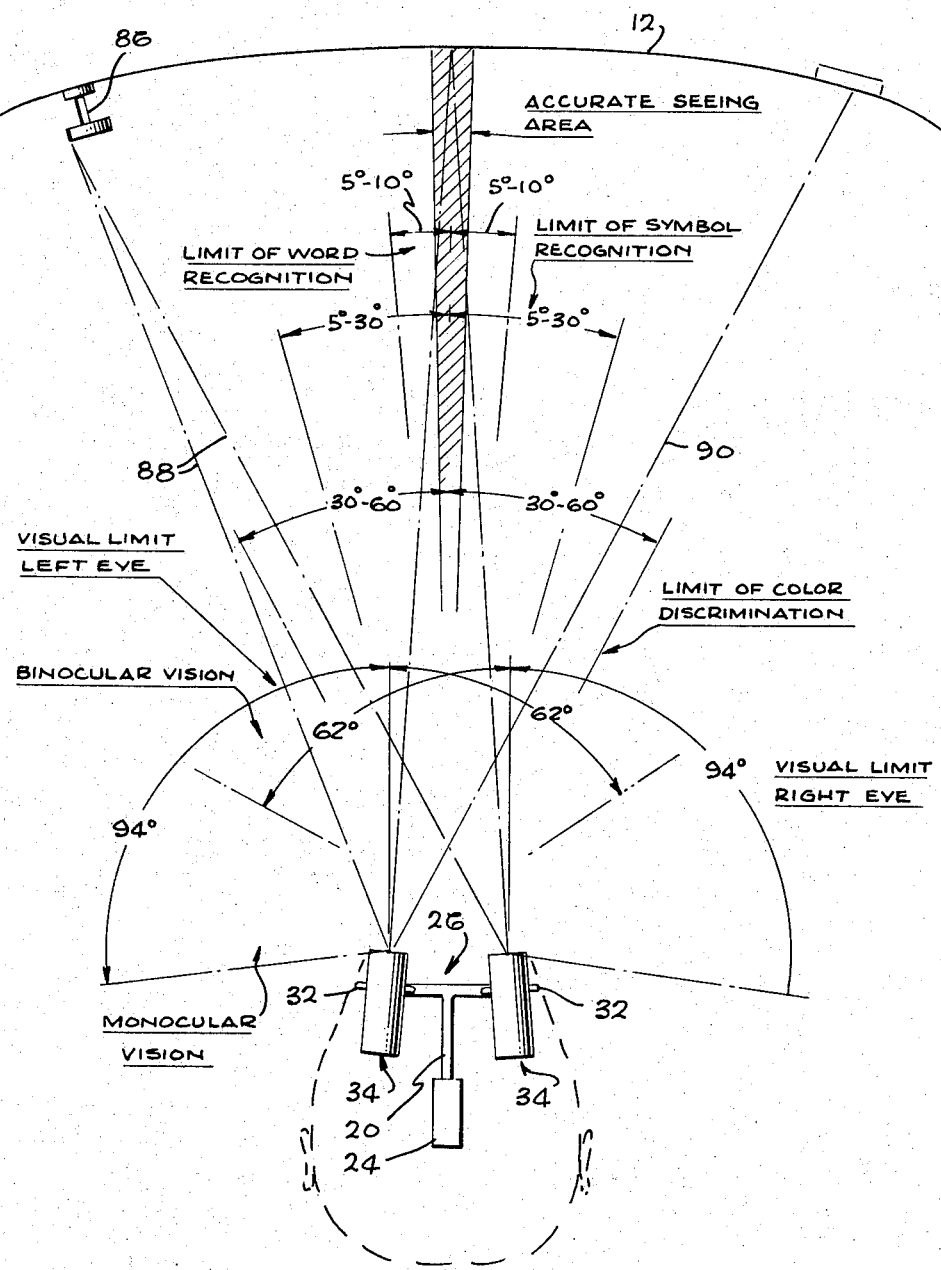

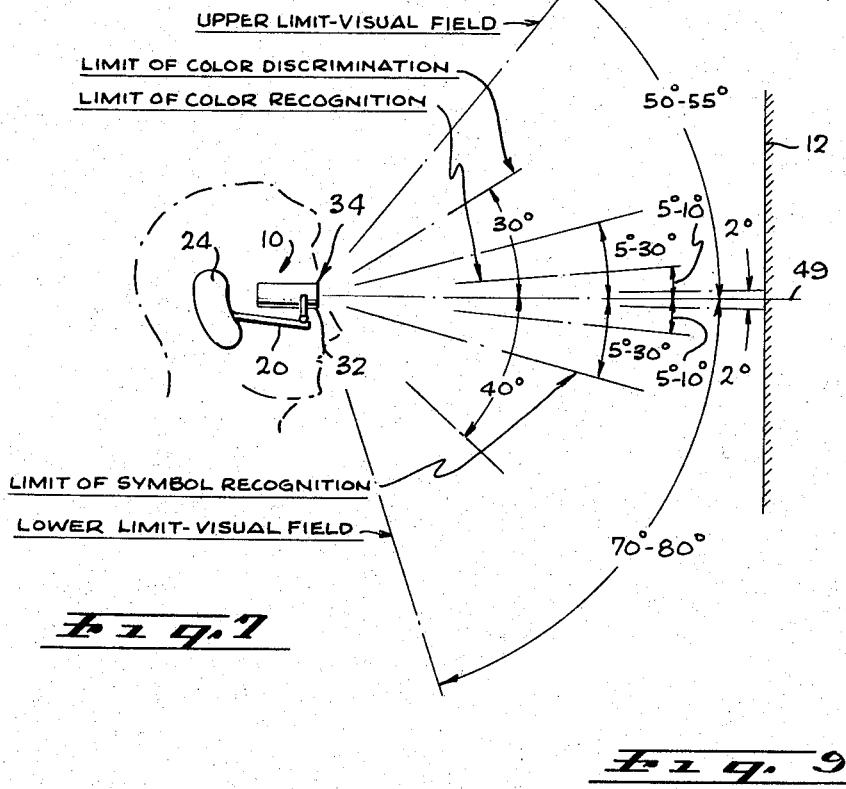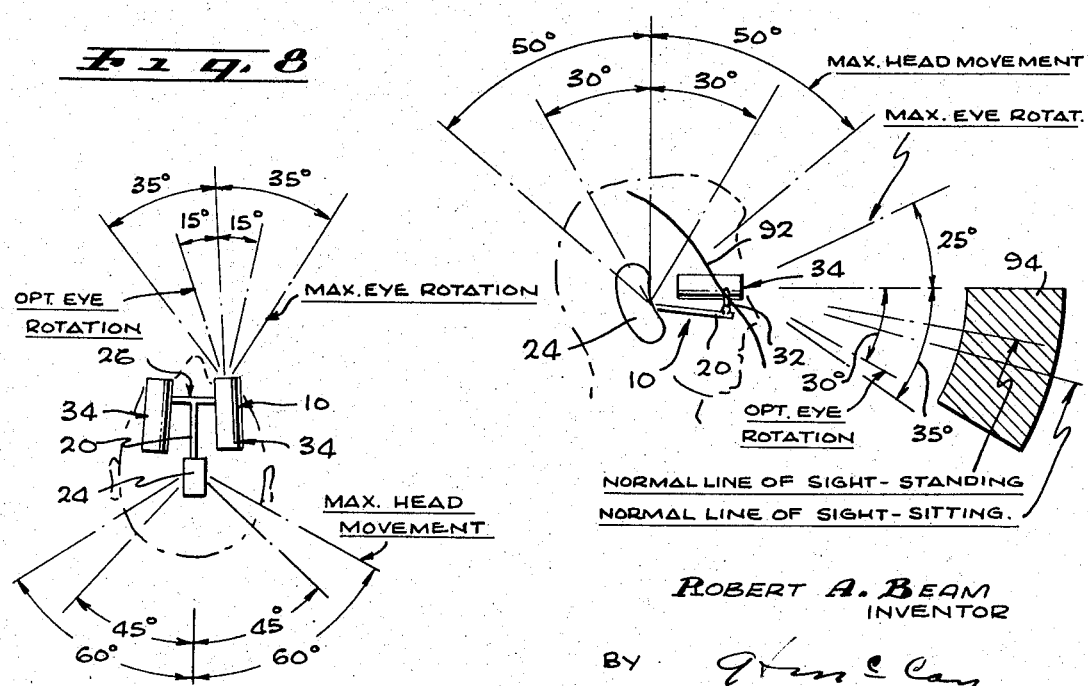

Dec. 26, 1967   JAMES E. WEBB   3,359,855
ADMINISTRATOR OF THE NATIONAL AERONAUTICS
AND SPACE ADMINISTRATION
OPTICAL PROJECTOR SYSTEM
Filed Sept. 9, 1966   5 Sheets-Sheet 5
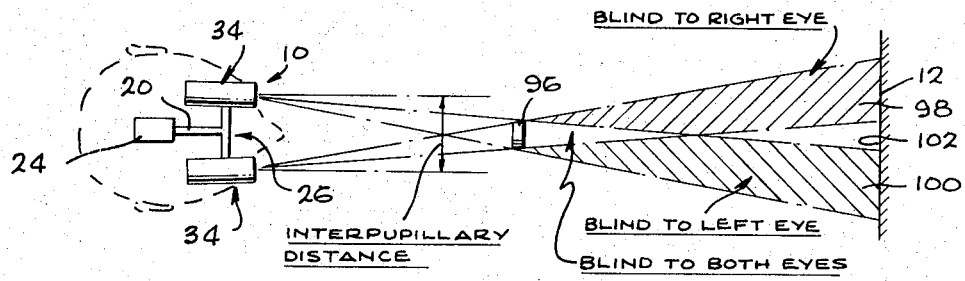
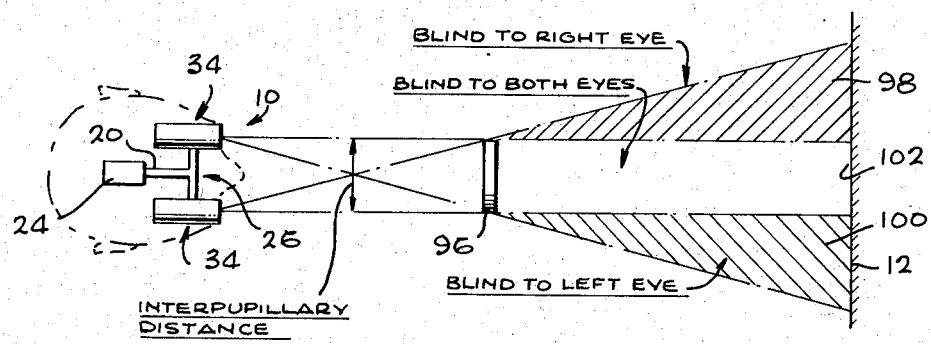
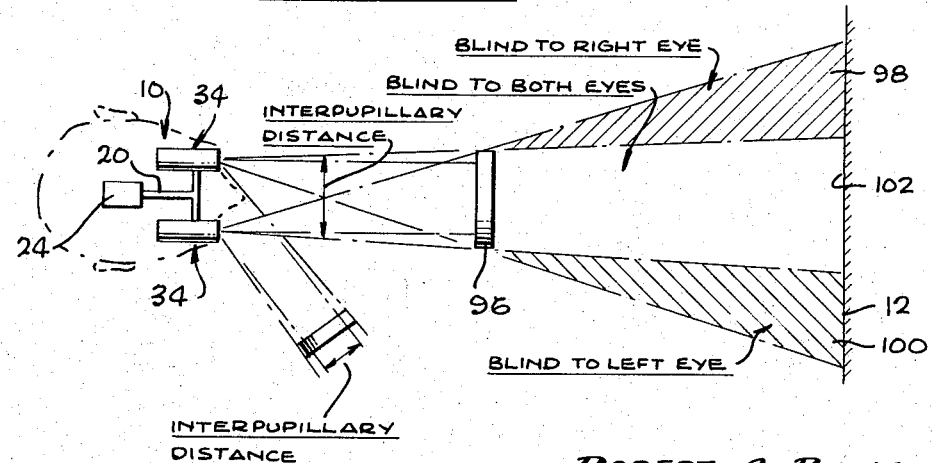
ROBERT A. BEAM
INVENTOR
BY
ATTORNEYS

United States Patent Office 3,359,855
Patented Dec. 26, 1967

3,359,855
OPTICAL PROJECTOR SYSTEM
James E. Webb, Administrator of the National Aeronautics and Space Administration, with respect to an invention of Robert A. Beam, La Habra, Calif.
Filed Sept. 9, 1966, Ser. No. 578,931
6 Claims. (Cl. 88—24)

This invention relates to an image projector system for determining or establishing the optimum arrangement of instrument displays employed in aircraft, spacecraft, other vehicles and industrial instrument consoles.

When plotting or designing the arrangement of a control panel, including displays such as instruments, dials, and indicators, it is necessary to distribute the instruments so those considered most critical are located for ready visual convenience, those less critical are distributed around those most critical but still within visual range. Those displays considered less critical are distributed about those considered most critical.

The magnitude of importance is a function of the purpose and workload on the operator. Instruments that are used (or monitored) at or near the same time, should be located close to each other. Critical and frequently used instruments and displays should be located near the center of the panel. As the number of instruments and displays increase, and the more critical and complex the monitoring becomes, the greater the problems of instrument and display design and location become. When the designer attempts to properly locate a display, consideration should be given to the functional relationship with other instruments. For example, when an operator has both eyes accommodated and converged at a given point or instrument on the panel, in many cases it is required that he be able to recognize words, symbols, colors, and/or movements adjacent to this point or as far away as the ability of his eyes will allow. Also contributing to the design and location of instrument and displays is parallax, which is the false indication on a dial or instrument face, caused by viewing the pointer at an angle. In addition, controls, which protrude from the panel, and/or other obstructions between the observer, cause blind areas and/or shadows, thus rendering it difficult or impossible to read instruments in these areas. Thus, in summary, contributing to the problem of locating a display of instruments are five basic factors: (1) word recognition; (2) symbol recognition; (3) color recognition; (4) peripheral vision limitations, and (5) limits of eye and head rotation, vertically and horizontally. For instance, an extremely critical instrument may employ colors, symbols, or words, or a combination of all three to inform an observer of operating conditions. Thus, when defining the location of the instrument, it is necessary to take into consideration the ability of an observer to recognize color, symbols and words. Also contributing to the problem of plotting instrument displays is parallax, whether the view of the instruments will be obstructed by some object, and whether allowances need be made for weaknesses of the observer's eyesight. Parallax is defined as "the apparent displacement (or the difference in apparent direction) of an object, as seen from two difference points." Still another condition which contributes to the overall problem is whether the instruments are located on a flat surface in front of the observer or whether a curved "wrap around" surface is employed. All these and other factors are to be considered when plotting instrument displays.

Various devices and systems have been devised in an attempt to solve the aforementioned problems, but each of the systems or devices create as many problems as they solve. For instance, there is one family of devices which operates on the premise the observer's head and eyes are rigid, and therefore capable of only observing that which is directly in front and on a prescribed level. These devices also require the observer to be an integral component of the device, and therefore, the instruments are located and arranged according to rigid prescribed, but unrealistic conditions. Without an observer present, an instrument cluster cannot be designed. The devices, per se, are relatively complex, but the complexity fails to provide for versatility.

Another family of mechanical devices are similarly complex and lack versatility, but the observer is not required. This family is one of the types presently employed. Use of this technique results in a multiplicity of control or instrument panel plottings outlining the general visual limits at various proposed display and/or instrument locations. These devices, as well as those aforementioned, completely fail to consider an observer is capable of moving his head and eyes.

As a result of the rigid conditions imposed by the prior art devices, the instruments are all required to be located in an extremely dense cluster immediately in front of the observer. No consideration is given to peripheral vision, color, symbol, or word recognition, and all the other aforementioned factors and conditions which impose their influence on observers and instrument displays are ignored.

However, the present invention comprises a solution to the aforementioned problem and all the factors contributing thereto. The device comprises an optical projector system which projects an image for each eye, and which may take into consideration peripheral vision, as well as color, symbol and word recognition. The projector system also includes provisions to simulate vertical and horizontal eye movement, together with vertical, horizontal and angular head movement. The system does not require the cooperation of an actual observer. The image projector system includes the ability to provide for particular visual characteristics of individual observers. For instance, an instrument display may be arranged which provides for reductions and changes in normal visual limits from such factors as pressure unit visor restrictions, lack of sufficient oxygen, G forces, light versus dark adapted eyes, and moving the eyes farther away or near to the display panel.

FIGURE 1 is a perspective view illustrating the image projector system as it would be employed to plot an instrument display on a curved instrument panel;

FIGURE 2 is a longitudinal cross-sectional view through one of the image projectors illustrating the arrangement of lenses, slides, and slide illumination means;

FIGURE 3 is a cross-sectional view, partially in elevation, taken on line 3—3 on FIGURE 2;

FIGURE 6 is a view illustrating the various horizontal visual limitation characteristics for an average observer wherein the limits of peripheral vision are defined and the limits of color, symbol and word recognition are shown;

FIGURE 7 is a view illustrating the vertical visual limitations as determined by the image projector system;

FIGURE 8 is a view illustrating the extension of visual limits obtained by horizontal eye and head rotation as established by the present invention;

FIGURE 9 is a view illustrating the extension of visual limits obtained by vertical eye and head movement;

FIGURES 10-12 are views illustrating visual limitations imposed on the eyes due to obstructions being between the observer and instrument panel.

The invention illustrated in use in FIGURE 1 comprises an image projector system 10 for plotting a cluster of instruments on a curved or flat instrument panel 12. It is to be understood the instrument panel may also be flat and in most instances these are the circumstances. However, a curved instrument panel contributes to the solution of providing optimum instrument displays. The projector system contains features which simulate the horizontal, vertical, and angular movement of an observer's head. Other features also provide for simulating the vertical and horizontal movements of an observer's eyes. These features, the details of which will hereinafter be more specifically described, enable plotting or arranging a cluster of instruments on panel 12 to obtain optimum viewing by an observer.

For instance, projected image 14 provides for defining the peripheral limits of a viewer or observer. This image, when projected on an instrument panel at a given point, FIGURE 4, will indicate the optimum location of instruments and signals on the panel so an observer may readily achieve color, symbol, and word recognition.

Figure 5:
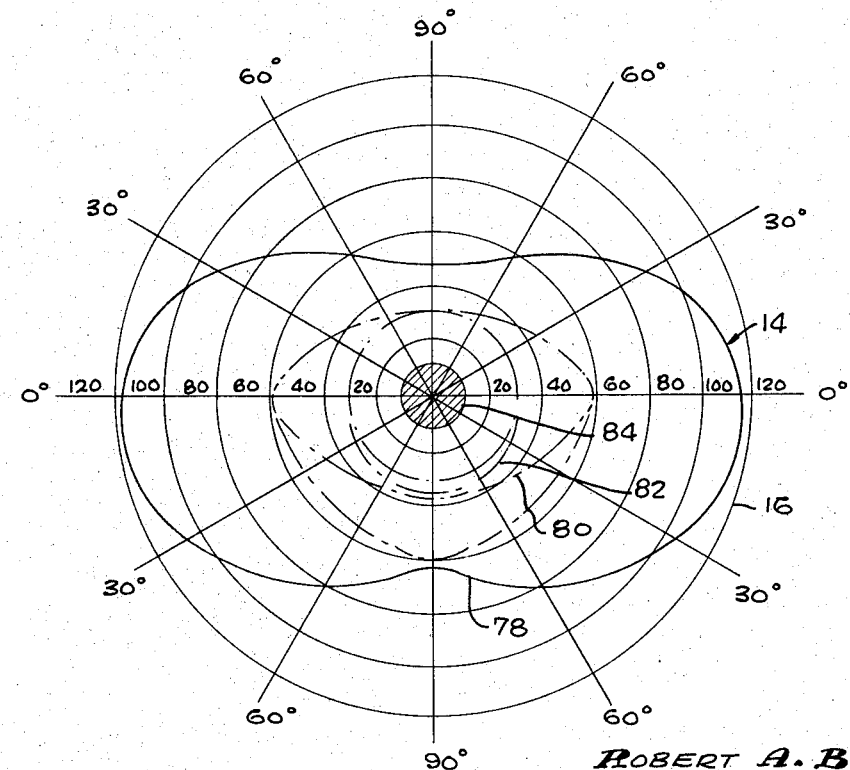
FIGURE 5 is a view illustrating the image projected by the projector system superimposed on a target wherein peripheral and other visual limitations are defined.

The maximum and minimum limits of recognition are illustrated in FIGURE 5 wherein the image is projected onto a target 16, graduated into degrees.

Optical system 10, when properly employed will also provide for determining, in addition to the foregoing, the limits of monocular vision, binocular vision and ambinocular vision, which is the total contribution of both eyes, FIGURE 6. This figure also illustrates the manner in which the projector system contributes to establishing parallax conditions. Obstructions which render a portion of the instrument panel in shadow, and thus obscure accurate reading of a shaded instrument, are also determined by use of the image projector system as hereinafter related.

The eyes obviously have vertical as well as horizontal peripheral vision, and using the projected image 14 in the manner illustrated in FIGURE 7, it is possible to determine the limits of vertical distribution of instruments so as to achieve color, symbol and word recognition. FIGURE 8 illustrates the manner in which the system is employed for arranging instruments when consideration is given to horizontal side-to-side movement of the eyes, combined with horizontal movement of the head; FIGURE 9 does the same thing for vertical movements of the eyes and head.

Obstructions in front of the observer create blind areas on the instrument panel 12. By merely projecting the light from the projector system, the obstructions produce shadows on the instrument panel which identify the areas not readily viewed by an observer, as is evidenced by FIGURES 10–12.

FIGURES 1–3

Returning to the optical projector system 10, illustrated in FIGURE 1, wherein the vertical, horizontal, and angular movement simulating movement of an observer's head is provided by the combination of a vertical standard 18 and a T-shaped horizontal arm 20 joined by a ball and socket joint 22, the joint being disposed to reliably represent the pivot point of a head and also being disposed within a fitting 24. The fit of the ball within the socket is such as to provide frictional bias so as to avoid movement until required or desired.

Simulation of horizontal side-to-side movement of an observer's eyes is achieved by the combination of cap 26 of T-arm 20 wherein, spaced from each end thereof, is an upwardly extending stub shaft 28 which is received in a socket 30, the combination of shaft and socket providing the vertical axis of rotation of a horizontally pivotal C-shaped bracket 32. Each stub shaft has a snug, frictional bias fit in each socket so as to avoid unpredictable movement of each bracket 32. The socket of each bracket is located substantially midway of the bight and below the upwardly facing open end of the bracket.

An optical image projector broadly designated 34 is pivotally supported by the opposed free ends of each bracket, the free ends providing the horizontal axis of rotation for the projectors. The pivotal arrangement of each projector on each bracket reliably simulates the vertical up and down movement of each eye, and of course each projector represents each corresponding eye.

Each stub shaft 28 and socket 32 is directly below the center of gravity of the respective projector 34 so as to obtain a balance to avoid unpredictable movement of the projector. Additionally, the points of pivot between each projector and bracket is frictionally biased to avoid movement without selection.

The optical image projectors 34 are substantially identical and therefore, only one will be described. Referring to FIGURES 2 and 3, each projector includes an elongated hollow tube 36, with the rear end 38 being closed, and the front end 40 being open. Supported adjacent the rear end of tube 36 is a parabolic reflector 42 which reflects the light from lamp 44 toward the open end of the tube. Power to illuminate lamp 44 may be provided by any available power source 46, including batteries, if desired.

Forward of lamp 44 is a condenser lens 48, and forward of the lens is a photographic slide 50 having an image thereon which will hereinafter be considered in a greater detail. Tube 36 has a slot 52 therein to accommodate insertion of the slide into position within the projector. Immediately forward of slide 50, and mounted in the open end or front end of tube 36, is a wide angle lens 54 which provides for a wide angle display of the image on slide 50.

The spacing of the eyes of each individual varies, and therefore, provision is made in the optical projector system to simulate the condition. Cap 26 comprises a hollow elongated tube 56 which has telescopically disposed therein a smaller tube 58. Obviously, one bracket 32 is fastened to one tube and the other bracket is fastened to the opposed tube. Tube 56 has an elongated slot 60 therein which receives a key 62 on tube 58. By this means, projectors 34 may be moved closer or further away from each other, and the key and slot arrangement prevents rotation of the projectors from proper alignment.

Referring again to FIGURE 1, the combined images 14 are shown projected onto curved panel 12. The images are partially overlapped for the purpose of illustrating the degree of cooperation each eye contributes to the other. The outer elliptical ring 78 of each image defines the ambinocular viewing limits of an average observer, the extremities of which indicate the limit of peripheral vision. The face of the observer dictates the elliptical phase of the various rings since the nose obstructs inward eye movement whereas no such obstruction exists for outward viewing. The next inner ring 80 of each image defines the outer limits of color recognition. Within ring 80 is another ring 82 which defines the outer limits of symbol recognition, and the circular hatched region 84 defines the region of word recognition. Of course, it is to be understood, even though an observer may not recognize color outside of ring 80, the turning on or off of a light or flashing lights may be recognized.

FIGURE 4

Figure 4:
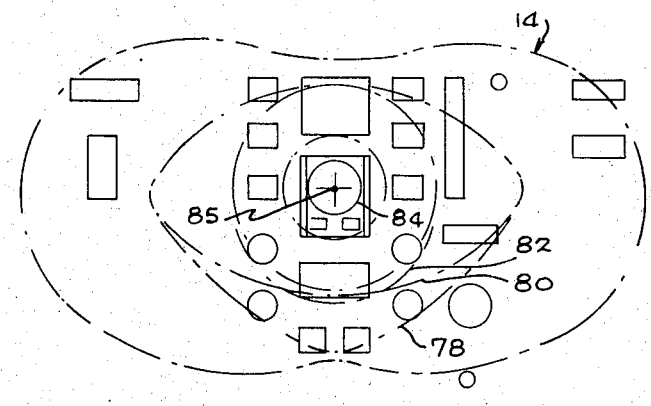
FIGURE 4 is a view illustrating in dotted lines the image projected by the projector system superimposed over a proposed cluster of instruments arranged in accordance with the conditions prescribed by the image.

The purpose of the foregoing explanation was to provide a broad understanding of the optical projector system 10 and its manner of operation, whereas hereinafter attention will be directed to specific figures wherein specific details of operation will be described, beginning with FIGURE 4. Arm 20 is substantially horizontal and projectors 34 are set to project images 14 to converge at any given point on instrument panel 12 for the purpose of locating those instruments considered to be most critical when an observer is looking straight ahead. Within outer ring 78, and outside of inner ring 80, are located the instruments or indicator which produces steady or flashing light which will draw the observer's attention to the region. Inside of inner ring 80, and outside of ring 82, are those instruments which, when operational, produce colored lights to attract the observer's attention. Also instruments using unlighted colored indicia are located in this region. Outside of the hatched region 84, and within ring 82, are located the instruments which employ symbols to indicate operating conditions, but these symbols do not include the use of words. Within the hatched areas, or region 84, are located the instruments which employ words to identify for the observer conditions with which he should be aware. Also located in this region may be printed instructions for performing certain operations or functions. Attention is directed to the cross-hair center 85 which represents convergence of both observers' eyes. This cross-hair center may be located at any position on panel 12 for purposes of evaluating or plotting the arrangement of an instrument cluster. In other words, changing the position of the cross-hair also includes changing the position of projectors 34.

FIGURES 5 AND 6

A more detailed understanding of the significance of image 14 may be obtained by referring to FIGURE 5 wherein the image is superimposed on a circular target which is graduated outwardly from the center, zero point, in degrees. It is readily discernible outer ring 78 of each image has an outer limitation of approximately 120° which, in terms of an observer looking straight ahead, means about 30° is behind the right or left side of the observer. Since such is the case, the image is readily applicable for plotting the arrangement of instruments on a curved instrument panel wherein a portion of the panel is behind and on the right or left side of the observer.

Further understanding of the relationship of the image 14 and ring 78 may be obtained by referring to FIGURE 6 wherein it is illustrated monocular vision of the right or left eye is capable of viewing a region of about 94°, thus enabling an average observer to see to his rear about 4°. In order to insure the viewing limits of an observer are thoroughly covered, ring 78 covers a region of about 120°. On the other hand, binocular vision is restricted to a maximum viewing range of about 62°, as is evidenced in FIGURE 6.

Inner ring 80, as illustrated in FIGURE 5, has a maximum outer viewing limit for monocular vision of approximately 60°, but binocular vision contributes to his viewing range and all viewing ranges which are less than 60°. In order to avoid unnecessarily cluttering an instrument panel, the instruments employing color exclusively should be located in a region extending from 30°–60°, on each side horizontally of the center point; the vertical viewing range will be considered hereinafter in greater detail.

The symbol recognition ring 82 has a maximum viewing region of about 30°, and again in order to arrange an instrument cluster in the most efficient manner, the instruments employing symbols should be arranged in an area ranging from 5°–30° on each side horizontally of the center. Of course the word recognition region 84 covers the inner 10° or 5° on each side of the center point.

FIGURE 5 further illustrates there are vertical or upward and downward visual limitations defined by rings 78, 80, 82 and 84 which are about 60°, 40°, 20°, and 5°, respectively, measured vertically on each side of the center point.

FIGURE 6 further illustrates the condition wherein an obstruction 86 is mounted on the instrument panel which may be in the nature of a control handle, dial or another instrument. The vision from the left and right eye represented by lines 88 indicate vision of an instrument would be impaired if located closely adjacent the obstruction.

Also located on the right side of panel 12 is an instrument wherein a dial is located which is angularly displaced from the left and right eye of an observer. A parallax condition is thus created, represented by line 90, whereby an accurate reading of the dial is unobtainable. In other words, the eyes locate the instrument needle to the right of the actual reading, as it is viewed in FIGURE 6. In the event instrument panel 12 is flat, as aforementioned, the condition of parallax and obstruction is further aggravated to the extent the instrument may provide a critical false reading or be totally obscured, respectively.

This condition clearly illustrates another purpose for the optical projector system 10. Where instruments include dials and needles, the face of the dials may be designed to compensate for the parallax condition.

FIGURE 7

The range of vision and the ability to achieve color, symbol and word recognition is further illustrated in FIGURE 7 wherein use of the optical projector system 10 is employed to ascertain the vertical visual condition, as contrasted with FIGURE 6 wherein the horizontal was established. It will be recalled image 14, when projected onto target 16, displayed vertical peripheral visual limitations, for an average observer, of about 60°. However, FIGURE 7 illustrates an average observer has a lower vertical peripheral visual limitation of between about 70–80° and an upper vertical peripheral vision of about 50–55° when the head is held steady with the eyes looking straight ahead. The variation from upper and lower vertical peripheral vision is determined by an observer's forehead. Therefore, to plot an arrangement or cluster of instruments in the region below and above a center line 49, which is in accordance with an average observer, another slide 50 should be employed which will have a projected image covering the maximum ranges defined.

Certain types of instruments should be located within the aforementioned outer maximum limits and the inner limits of about 40° which is the outer maximum limit for color recognition. The range of symbol recognition is between about 5°–30° as it was in FIGURE 6, and, of course, word recognition ranges up to 5°–10°. Needless to say, the instruments employing color, symbols and words should be distributed within the regions defined by the image used in the projector system 10, illustrated in FIGURE 7.

FIGURES 8 AND 9

As previously related, the versatility of the optical projector system 10 provides for determining the arrangement of clusters of instruments for optimum viewing when the head of the observer is turned right or left, or is pivoted up or down. It is, of course, very often impossible to arrange instruments on an instrument panel where all the instruments are directly in front of the observer. Therefore, it becomes necessary to utilize the observer's ability to turn his head and move his eyes, but it is also necessary to determine the headturning limits and the eye-moving limits, and thus distribute the instruments so they are clustered within the determined limits and readily viewable by the observer. FIGURES 8 and 9 illustrate how the image projector 10 is employed for achieving the aforementioned conditions.

It has been related each projector 34 is horizontally pivotal about a vertical axis defined by corresponding stub shaft 28. This pivoting effectively simulates the horizontal movement of the eyes. It was further related the projector system 10 was pivotal horizontally about an axis defined by the ball and socket joint 22 which realistically simulates horizontal movement of the head. FIG- URE 8 illustrates the manner of employing this pivotal condition.

Experimentation has determined the average individual can easily move his eyes horizontally, about 15° each side of a vertical center line, and maximum horizontal eye rotation is about 35°. Thus, by pivoting the projector 34 so as to create these conditions, and at the same time project a suitable image, instrument location on an instrument panel may be determined.

It has similarly been determined an average observer is capable of rotating his head horizontally between 45°–60°. Thus, by rotating the optical projector system 10 a similar amount, the best arrangement for locating a cluster of instruments may be determined.

However, one feature should also be given consideration which is the combination of horizontal head rotation and eye rotation. If the maximum horizontal limits are considered for head and eyes, the optical projector system 10 may be horizontally pivoted 60° and each projector further horizontally pivoted another 35°, providing a total of 95°. Thus, instruments may be distributed within the range of 95° from a vertical center line. Further, the projected image 14 provides for additional latitude since the conditions, which are illustrated in FIGURES 6 and 7, are also generally applicable to the conditions which exist when the projector system 10 and projectors 34 are horizontally pivoted.

Attention is directed to FIGURE 9 wherein is illustrated the conditions which exist when an observer's head is vertically pivoted from a horizontal center line. Again, experimentation has determined an average observer may vertically pivot his head up and down between about 30°–50°, the 30° pivoting being achieved relatively easily whereas a 50° vertical pivoting is achieved with some effort.

Also the eyes may be rotated upwardly about 25° and downwardly between about 30°–35°. Thus, pivoting the optical projector system 10 to provide for vertical head movement, and pivoting projectors 34 vertically, an optimum display of instruments may be plotted for an instrument panel which curves upwardly and over an observer. Again the projected image 14 provides for additional vertical and horizontal latitude.

FIGURE 9 further illustrates, by irregular line 92, the head, when pivoting vertically, does not describe a uniform arc. Although ball and socket joint 22 does provide for a uniform arc of travel of the projector system 10, it is to be understood a caming action may be employed which will define the arc of travel illustrated by irregular arcuate line 92.

Further, FIGURE 9 illustrates the normal line of sight for a standing and sitting observer.

The hatched region 94, shown in FIGURE 9, defines the optimum viewing zone for instrument displays when the observer is looking straight ahead.

FIGURES 10–12

Still another condition is to be considered when plotting instrument displays which are obstructions between the observer and instrument panel. This condition is illustrated in FIGURES 10–12, inclusive, with FIGURE 10 illustrating a relatively small obstruction 96, FIGURE 11 illustrating a larger obstruction and the visual conditions prevailing, and FIGURE 12 illustrating a still larger obstruction and the visual conditions resulting therefrom.

In order to use the optical projector system 10 to establish the conditions illustrated in the aforementioned three figures, a projected target image is not required. Instead, slide 50 may be removed from the respective projectors and only the projected light rays used since the obstructions will cast shadows represented by the hatched zones 98 and 100. However, it is not mandatory the slide be removed since casting of the shadows by projected light may be obtained with the slide and image thereon remaining within the projectors.

Employing the projector system in the aforementioned manner, it will be noted by referring to FIGURE 10, immediately behind obstruction 96 is an area which is blind to both eyes. There is also an area 102 on instrument panel 12 which is also blind to both eyes. Additionally, obstruction 96 creates a shadow region represented by hatched zone 98 which is blind to the right eye and another hatched zone 100 which is blind to the left eye of an observer. Thus, use of the projector system 10 establishes instruments, should not be located in area 102 since they cannot be seen, and critical instrument should not be located in the shadowed zones 98 or 100 since observation thereof is impaired by obstruction 96.

FIGURE 11 illustrates a condition similar to FIGURE 10 wherein the employment of projector system 10 establishes the obstruction 96, produces a region 102 on the instrument panel which is blind to both eyes; the obstruction also creates shadowed zones 98 and 100 which is blind to one or the other eye of an observer.

FIGURE 12 likewise illustrates substantially the same conditions, the only variations between the figures being the blind region 102 progressively increases in size, whereas the shadowed zones remain substantially uniform.

The optical projector system 10 is capable of providing for other conditions which are not illustrated. For instance, heretofore the description of the invention has been devoted to describing conditions which are applicable to an average observer, but projector system 10 may be used to plot an instrument arrangement or an instrument panel where the observer has a visual weakness.

If an environmental condition is imposed on an observer of the type aforementioned, which produces a visual impairment, then a slide may be prepared wherein the image thereon, and which is projected, would realistically reflect this visual change to thereby establish the optimum arrangement of an instrument cluster which provides and compensates for the change or alteration. Also an observer may not have wide peripheral vision such as is caused by helmet or G-load. In this case a slide again could be prepared which would allow for restricted peripheral vision. Additionally, an observer may have wide or narrow set eyes, the difference being measured only in fractions of an inch. In this case a slide again may be prepared to provide for this condition, or projectors 34 may be moved toward or away from each other in the manner heretofore described, or a combination of these two provisions may be employed.

While particular embodiments of this invention have been illustrated and described herein, it will be apparent that various changes and modifications may be made in the construction and arrangements of the various parts without departing from the spirit and scope of this invention and its broader aspects, or as defined in the following claims.

What is claimed is:

1. An optical projector system for evaluating as well as establishing the arrangement of instrument clusters which comprise:
   (a) a substantially vertical standard for pivotally supporting an arm which pivots on said vertical standard to simulate the horizontal, vertical, and angular movements of the human head;
   (b) a pair of spaced brackets pivotally supported by said arm, said brackets each being horizontally pivotal about a vertical axis so as to simulate the horizontal side-to-side movement of the eyes; and
   (c) a photographic slide projecting unit pivotally supported by each bracket, said units each being vertically pivotal about a horizontal axis so as to simulate the vertical up and down movement of each eye:
      (1) each of said units include a wide angle lens for achieving a wide angle display of a light source as well as the image on a slide, the display being such as to provide for accurately simulating the visual ability and limitations of each eye to establish the arrangement of instrument clusters.

2. An optical projector system, according to claim 1, wherein said projecting units are each movable horizontally toward and away from the opposed unit so as to simulate the spacing of the eyes.

3. An optical projector system, according to claim 1, wherein the pivotal connection between said standard and said arm comprises a ball and socket universal joint.

4. An optical projector system, according to claim 1, wherein said arm is T-shaped with the brackets disposed inwardly and adjacent the ends of the cap of the arm.

5. An optical projector system, according to claim 1, wherein said brackets are C-shaped with said projecting units each being pivotally disposed within the open end of the respective bracket and the vertical axis, about which said brackets pivot, being disposed midway of the bight of said brackets.

6. An optical projector system, according to claim 1, wherein each projecting unit has a slot therein for inserting and removing said slide; the slide, when located within the respective projecting units, being between said wide angle lens and the light source.

References Cited

UNITED STATES PATENTS

| | | | |
|---|---|---|---|
| 1,758,938 | 5/1930 | Feldner | 88—24 |
| 2,325,569 | 7/1943 | Hancock et al. | 240—1.3 |
| 3,298,277 | 1/1967 | Scharf | 88—24 |

NORTON ANSHER, *Primary Examiner.*

J. W. PRICE, *Assistant Examiner.*